US010922395B2

(12) United States Patent
Morestin et al.

(10) Patent No.: US 10,922,395 B2
(45) Date of Patent: Feb. 16, 2021

(54) FACIAL AUTHENTICATION SYSTEMS AND METHODS UTILIZING TIME OF FLIGHT SENSING

(71) Applicant: STMICROELECTRONICS, INC., Coppell, TX (US)

(72) Inventors: Frederic Morestin, Santa Clara, CA (US); Xiaoyong Yang, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 111 days.

(21) Appl. No.: 16/240,213

(22) Filed: Jan. 4, 2019

(65) Prior Publication Data

US 2019/0213309 A1 Jul. 11, 2019

Related U.S. Application Data

(60) Provisional application No. 62/614,314, filed on Jan. 5, 2018.

(51) Int. Cl.
*G06F 21/32* (2013.01)
*G06K 9/00* (2006.01)
*G01S 17/08* (2006.01)
*G06T 7/521* (2017.01)
*G01S 7/4865* (2020.01)
*G06K 9/20* (2006.01)
(Continued)

(52) U.S. Cl.
CPC ............ *G06F 21/32* (2013.01); *G01S 7/4865* (2013.01); *G01S 17/04* (2020.01); *G01S 17/08* (2013.01); *G01S 17/89* (2013.01); *G06K 9/00255* (2013.01); *G06K 9/00288* (2013.01); *G06K 9/2027* (2013.01); *G06T 7/521* (2017.01); *G06T 2207/10028* (2013.01); *G06T 2207/10048* (2013.01); *G06T 2207/30201* (2013.01)

(58) Field of Classification Search
CPC ............ G06K 9/00288; G06K 9/00255; G01S 17/026; G01S 17/08; G06T 7/521
See application file for complete search history.

(56) References Cited

U.S. PATENT DOCUMENTS

2015/0066494 A1* 3/2015 Salvador ............. G10L 21/0202
704/224
2015/0161434 A1* 6/2015 Ross ...................... G06F 21/32
382/118

OTHER PUBLICATIONS

Bartels, "Applications for Time-of-Flight Cameras in Robotics, Logistics and Medicine," White Paper BAS1708, Aug. 2017, 7 pages.
(Continued)

*Primary Examiner* — Ruiping Li
(74) *Attorney, Agent, or Firm* — Seed IP Law Group LLP

(57) ABSTRACT

The present disclosure is directed to a system and method of authenticating a user's face with a ranging sensor. The ranging sensor includes a time of flight sensor and a reflectance sensor. The ranging sensor transmits a signal that is reflected off of a user and received back at the ranging sensor. The received signal can be used to determine distance between the user and the sensor, and the reflectance value of the user. With the distance or the reflectivity, a processor can activate a facial recognition process in response to the distance and the reflectivity. A device incorporating the ranging sensor according to the present disclosure may reduce the overall power consumed during the facial authentication process.

17 Claims, 5 Drawing Sheets

(51) Int. Cl.
*G01S 17/89* (2020.01)
*G01S 17/04* (2020.01)

(56) References Cited

OTHER PUBLICATIONS

Haselton, "Samsung Galaxy S8's facial recognition can be tricked with a photo," Mar. 31, 2017, URL=https://www.cnbc.com/2017/03/31/galaxy-s8-facial-recognition-can-be-tricked-with-a-photo.html, download date Jan. 5, 2018, 3 pages.
Microsoft, "Windows Hello face authentication," May 1, 2017, URL=https://docs.microsoft.com/en-us/windows-hardware/design/device-experiences/windows-hello-face-authentication, download date Dec. 28, 2018, 4 pages.
Yoshida, "iPhone X's TrueDepth Module Dissected," Nov. 17, 2017, URL=https://www.eetimes.com/document.asp?doc_id=1332615&page_number=1, download date Dec. 28, 2018, 3 pages.

\* cited by examiner

FACIAL AUTHENTICATION SYSTEMS AND METHODS UTILIZING TIME OF FLIGHT SENSING

BACKGROUND

Technical Field

The present application is directed to a facial authentication system that utilizes a time of flight sensor to identify a user's face for authentication purposes.

Descriptions of the Related Art

Conventional facial authentication systems use image sensors such as RGB cameras (i.e., cameras that capture red R, green G, blue B bands, so that the images the cameras produce recreate almost exactly what the human eyes see), infrared (IR) cameras, sensors using structured light, stereoscopic cameras or the like mounted on an electronic device to authenticate a user's face for granting access to use the electronic device. Some of the examples of conventional facial authentication systems include Apple's Face ID, Microsoft's Windows Hello, and Samsung Galaxy's face recognition system. Such facial authentication systems require a significant amount of image processing power in the device. and accordingly consume more power during the authentication process. Further, some systems are vulnerable to spoofing attempts made by unauthorized users of the device. These attempts include, for example, using a photo printout of the authorized user, using a photo of the authorized user having IR coatings applied on the photo, and wearing a mask of the authorized user manufactured with a 3D printer, etc., to bypass the authentication process. Employing RGB cameras, IR cameras, image sensors using structured light, stereoscopic cameras or other sensors in the electronic device may not help overcome these fraudulent attempts to bypass the facial authentication process, and having numerous sensor modules embedded in the device will also drive up the cost of the device.

Due to these shortcomings in the conventional facial authentication system, there is a need for an accurate, less expensive, and less power-consuming face authentication system.

BRIEF SUMMARY

The present disclosure provides various embodiments of facial authentication devices and methods. The facial authentication devices and methods utilize time of flight (ToF) sensing to improve security and accuracy of facial authentication techniques which may be employed in electronic devices such as laptop computers, tablet computers, smartphones, or the like. Facial authentication may be employed in such devices, for example, as a mechanism to sign-in or otherwise unlock and access the devices, or to unlock one or more particular features of such devices. Additionally, the facial authentication devices and methods provided herein may be utilized in security systems, such as cameras installed near a door, that may be used for identifying and providing access (e.g., by selectively unlocking the door) to authorized persons. The facial authentication devices and methods provided herein are not limited to use in the particular applications provided in this disclosure; instead, the embodiments provided herein may be used in many different applications where facial authentication may advantageously be employed.

In various embodiments, the devices and methods may include different types or configurations of ToF sensors capable of detecting one or more distance measurements and surface reflectance measurements, depending on the intended application. For example, in one or more embodiments, a ToF sensor that senses only a distance of an object from the device may be utilized. In other embodiments, a ToF sensor may be utilized that senses basic depth information associated with the object, and further detects reflectance of the object (e.g., surface reflectance of a human's skin). In some embodiments, a ToF sensor may be utilized that acts as a depth camera, and is capable of providing a full depth map of an imaged scene or of an object in the scene, and further may detect the reflectance of the object.

Additionally, in one or more embodiments, an ambient light sensor may be used in conjunction with the ToF sensor to improve low light imaging; for example, by detecting low light conditions and turning on the flash (or a beam generator) of a camera. In such embodiments, the ToF sensor in connection with a processor of the device can control the flash power based on the detected distance to the object and the amount of ambient light within a field of view of the ToF sensor.

One aspect of the present disclosure is to provide a facial authentication device and method capable of using the time of flight sensor on top of the conventional facial authentication system to improve power consumption efficiency in the device. Another aspect of the present disclosure is to provide a facial authentication system and method capable of using an ambient light sensor and a beam generator on top of the conventional facial authentication system to improve power consumption efficiency in the device.

Still another aspect of the present disclosure is to provide a facial authentication device and method capable of using the time of flight sensor in conjunction with the ambient light sensor on top of the conventional facial authentication system to improve power consumption efficiency in the device.

Yet another aspect of the present disclosure is to provide a facial authentication device and method capable of using a full-power time of flight sensor to replace conventional RGB cameras or IR cameras for performing a facial authentication process.

The facial authentication employing a time of flight sensor according to the present disclosure helps to maintain low cost in manufacturing electronic devices employing facial authentication systems. It further provides improved precision in accurately detecting a user's face during a facial recognition/authentication process, while consuming reduced power of the device.

BRIEF DESCRIPTION OF THE SEVERAL VIEWS OF THE DRAWINGS

Reference will now be made by way of example only to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

DETAILED DESCRIPTION

Figure 1:
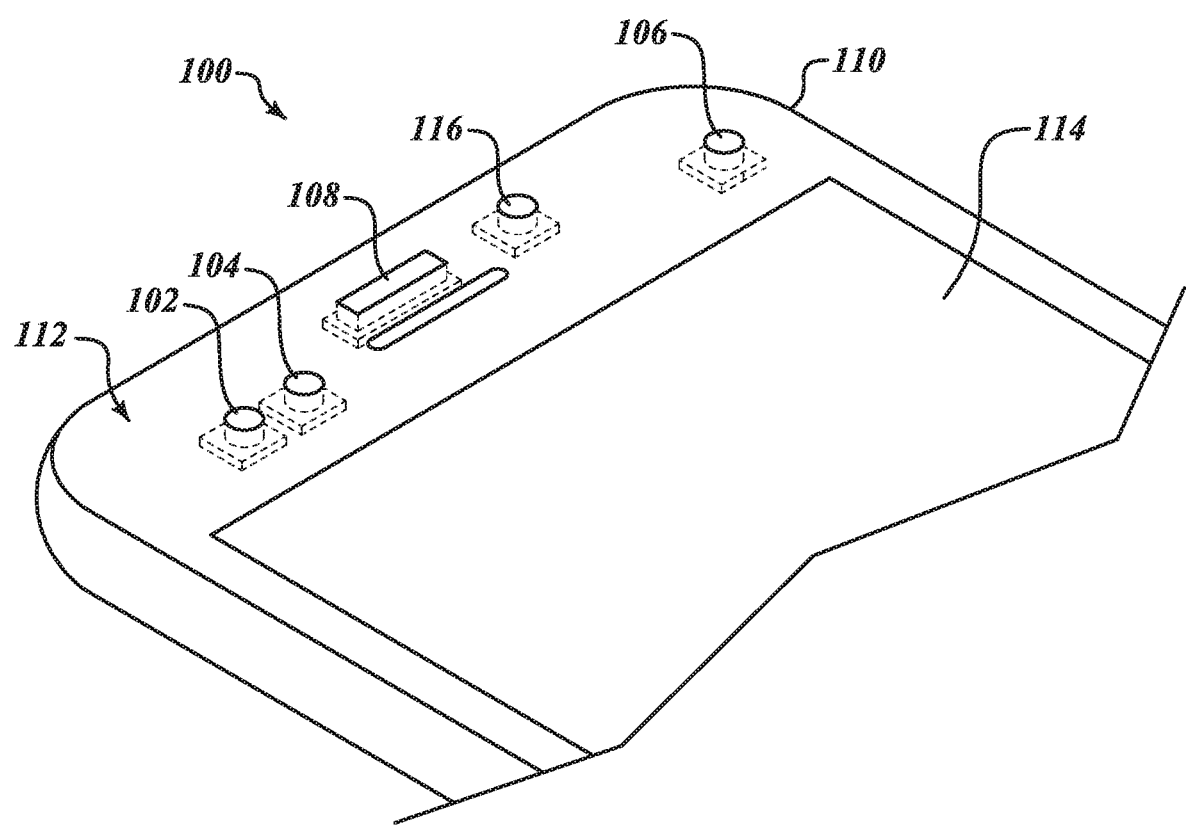
FIG. 1 is a perspective view illustrating an electronic device capable of facial authentication, in accordance with one embodiment of the present disclosure.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known algorithms associated with facial recognition, facial detection, and facial authentication have not been shown or described in detail, to avoid unnecessarily obscuring descriptions of the embodiments. Further, well-known structures associated with the time of flight sensor have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The break lines in the drawings are used to indicate that there are more elements present, but that are omitted for the sake of simplicity.

FIG. 1 is a perspective view illustrating an electronic device 100 capable of facial authentication in accordance with one embodiment of the present disclosure. The electronic device 100 includes a housing 110, which forms an external portion of the electronic device 100. The housing 110 includes a ranging sensor 102, a reflectance sensor 104, an RGB camera 106, an ambient light sensor 108 and a beam generator 116.

The housing 110 surrounds internal electronic components and/or circuitry of the device 100, including, for example, electronics such as processing circuitry, driving circuitry, communication circuitry, power management circuitry, accelerometers, gyroscopes, memory chips, and various sensors capable of detecting motion, light and the like, etc. The housing 110 may be formed to surround or at least partially surround externally located portions of the device 100, such that moisture, liquid, fluids or other external materials are prevented from entering the housing 110. The housing 110 may be formed of any suitable materials, and in some embodiments, the housing 110 is formed of a plastic material or a metallic material. The housing 110 may be formed of a single piece (e.g., a single material that is molded surrounding the internal components) or may be formed of two or more pieces (e.g., top and bottom halves) which are bonded or otherwise attached to one another.

In other embodiments, the electronic device 100 houses speakers or microphones, as well as other various sensors and cameras such as infrared cameras (IR cameras), stereoscopic cameras, or proximity sensors; such components are not necessarily limited to the electronic components set forth above.

The electronic device 100 in the example embodiment of FIG. 1 may be any type of electronic device, such as a smart phone, a tablet computer, a laptop computer, or other type of mobile electronic device such as wearable devices, and may also be a non-mobile type of device, such as a desktop computer or a stationary security system.

A ranging sensor 102 is positioned on a first surface 112 of the electronic device 100. The first surface 112 as depicted shows the front surface of the electronic device 100, which is the surface where a user of the device 100 unlocks the display screen 114 and interacts with the device 100 through the display 114. In other embodiments, depending on where the sensors are located, the first surface 112 may refer to the opposite side of where the display 114 is located.

In one embodiment, the ranging sensor 102 includes distance sensors capable of detecting and measuring a distance of a selected point or element from the sensor. These distance sensors may be any suitable sensors capable of measuring distance. For example, the sensor 102 may utilize lasers, or any light sources for measuring distance. Other examples may include utilizing sound waves for measuring distance. In some embodiments, the ranging sensor 102 includes a time of flight (ToF) sensor. In FIG. 1, the ranging sensor 102 and a reflectance sensor 104 have been depicted as separate and distinct electronic components. However, in other embodiments, since time of flight sensors are capable of detecting both distance and surface reflectance of objects, the ranging sensor 102 and the reflectance sensor 104 can be incorporated into a single ToF sensor device or camera. The operation of the time of flight sensor and the reflectance sensor 104 will be explained in detail hereinafter.

A time of flight is a method for measuring the distance between a sensor and an object placed in a scene, based on the time difference between the emission of a signal (e.g., emitter) and its return to the sensor (e.g., collector), after being reflected by the object in the scene. For example, a photon may be emitted through the emitter, and when the photon hits a target object, it is reflected back, and the collector receives the photon to calculate the distance between the sensor and the target object. One formula that can be used to calculate the distance is as follows:

$$\text{Measured Distance} = (\text{Photon Travel Time})/2 \times \text{Speed of Light}$$

Accordingly, the time of flight sensor is a range imaging camera system that resolves distance based on the known speed of light, measuring the time of flight of a light signal between the sensor/camera and the subject for each point of the image. The terms sensor or camera, as used herein, may be used interchangeably. The time of flight sensors generally provide substantial sensing range, fast readings, and high accuracy while still maintaining small size, low weight and low power consumption characteristics. In addition, the time of flight sensors are not affected by light, so measuring distance in dark settings is also possible.

In one embodiment, the ranging sensor 102 has at least two modes, a first mode of operation and a second mode of operation. For example, the ranging sensor 102 may have a first mode that operates at a relatively lower power mode than a second mode. Under the first mode of the ranging sensor 102, the ranging sensor 102 detects a single point in a scene that is within a selected distance. Under the second mode of the ranging sensor 102, the ranging sensor 102 detects multiple points in the scene that are within a certain distance. The first mode enables the ranging sensor 102 to detect user presence that is proximal to the sensor 102. The second mode enables the ranging sensor 102 to detect a face, and to create a depth map of a face for facial recognition use.

Returning to the first mode of the sensor 102, since the ranging sensor 102 under the first mode detects distance of a single randomly selected point in a scene, it operates under a relatively low power. However, in order for the ranging sensor 102 to detect presence under the first mode, this single point is a point proximal to the sensor. One of the purposes of the first mode is to detect presence of a user proximal to the sensor, and in response to that detection, activate the second mode for detecting and generating face information (e.g., depth map of a face, distinctive features on the surface of a face, etc.) of the user. Accordingly, detecting presence of a user that is too remote or far away from the electronic device 100 may involve more power consumption, and may not be beneficial in starting the facial recognition process.

In one embodiment, the ranging sensor 102 senses a distance that is within a range of a first presence detection threshold and a second presence detection threshold. A user's face may not be able to be detected if the face is too close to the electronic device 100, or the lens of the ranging sensor 102. On the other hand, the user's face may not be able to be detected if the face is too far away from the electronic device 100. The ranging sensor 102 may not be able to effectively detect the distinctive facial features and create a depth map of that face without excessive power consumption of the device 100. The first presence detection threshold refers to a minimum distance that enables the ranging sensor 102 in the device 100 to initiate facial recognition of a user. The second presence detection threshold refers to a maximum distance that enables the ranging sensor 102 in the device 100 to perform facial recognition of a user. For example, if the user's face is beyond the second presence detection threshold, the sensor 102 may not be able to effectively build a depth map of the face of the user without involving excessive power consumption, even though the user may be within an angle of view of the ranging sensor 102. That is, while the ranging sensor 102 may be able to detect presence of the user under the first mode, it will not be able to create the depth map of the user under the second mode because it is beyond the preferred sensing range for facial detection. On the other hand, if the user's face is too close to the ranging sensor 102 (e.g., closer than the first presence detection threshold), so as to block the angle of view of the ranging sensor 102 partially or entirely, the ranging sensor 102 will be incapable of performing the facial recognition process under the second mode, even though a presence of the user may have been detected under the first mode. Therefore, the second mode to start the recognition is only entered if the distance of the face is between the first and second thresholds.

The first mode of ranging sensor 102 detects a distance of, for example, a single point in the scene within a certain range. If a user is present, either by waving in front of the device, standing in front of the device, or posing a gesture in front of the device, the sensor 102 will detect a distance change, and determine that a user is present. The liveliness, the motion, and the gesture of users are all detectable under the first mode to indicate user presence.

The second mode of ranging sensor 102 detects multiple points in the scene, preferably the user's face, within the range of the first presence detection threshold and the second presence detection threshold (hereinafter referred to as "face recognizable distance") to receive multiple distance measurements. As such, the second mode may operate at a higher power than the first mode. The face recognizable distance refers to a distance in which a face is positioned at a recognizable distance between a first presence detection threshold and a second presence detection threshold. In other embodiments, the face recognizable distance may refer to a range that falls between a first presence detection threshold and a second presence detection threshold, and a face may be recognizable when the face is positioned within this range. In one embodiment, detecting multiple points within the face recognizable distance can be performed by using multiple single-photon avalanche diode (SPAD) arrays in the time of flight sensor 102. The SPAD arrays of the time of flight sensor 102 may be used to effectively collect distance information from various zones of the face of the user. For example, the SPAD array of the sensor 102 may receive multiple distances from multiple zones of the face, and based on multiple distance measurements, the time of flight sensor 102 may generate the depth map of the face of the user within the face recognizable distance and within the angle of view of the sensor 102. The depth map of the face created may later be used for face authentication. A processing circuitry in the device 100 will incorporate this face-related information, and will compare the user's face information with those of a pre-stored authorized user's face information. Detailed explanation of the face authentication process will be provided in connection with FIG. 2.

The reflectance sensor 104 may be located on the first surface 112 of the device 100. The first surface 112 is depicted as the front surface of the electronic device 100 on the same side as the display screen 114. However, in other embodiments, the sensor 104 may be located on the opposite side of the first surface 112, and is not necessarily positioned on the same side as the display 114.

The reflectance sensor 104 is operable to sense a reflectance of the object in the scene based on a surface characteristic of the object. For example, the surface characteristic of a person in the scene is different from the surface characteristic of a non-person object in the scene. In one embodiment, the reflectance sensor 104 may determine that a sensed object is not a person if it has a high reflectance. For example, objects including metal may have a high reflectance compared to the reflectance of a human's skin. Generally, a surface reflectance value of a human being is different from that of other objects such as metal, plastic or the like. The reflectance sensor 104 in conjunction with a processor in the device 100 may have a pre-stored range of the surface reflectance value of a person, and may easily detect whether the reflectance value substantially matches those of a human compared to a non-human object. The reflectance sensor 104 also assists in preventing any attempts of face authentication fraud by using a picture of an authorized user's face for unlocking the device 100. The surface reflectance characteristics of a real human skin and a photo will differ significantly, and the reflectance sensor 104 will stop recognition if there are any attempts at spoofing the sensor. That is, the reflectance sensor 104 will analyze the distances to determine that the detected face is indeed a three-dimensional face, as opposed to a photograph or print of a human face.

In one embodiment, the reflectance sensor 104 may be a stand-alone sensor that detects surface reflectance of an object. However, in some embodiments, the reflectance sensor 104 may be incorporated into the ranging sensor 102. For example, a ranging sensor 102 according to an embodiment of the present disclosure is a time of flight sensor, and the time of flight sensor is capable of sensing distance as well as surface reflectance of an object. When the time of flight sensor determines distance based on the returned signal, the time of flight sensor can also sense signal amplitudes of the returned signal. The amplitude of a signal of the originally emitted signal may have a different amplitude from the reflected signal when it hits a surface of an object and reflects back to the time of flight sensor 102. For example, an object having high reflectance, such as metal, will not have reduced or attenuated signal amplitude in the reflected signal, whereas human skin may have substantially reduced signal amplitude in the reflected signal. This change of signal amplitude may be used by processors to identify whether the object is a person or a non-person based on a lookup table including signal amplitude information and surface reflectance information related to human skin. When a reflectance value is within the range of human skin, the processor may determine that the object is human based on the inputs from the reflectance sensor 104, or the time of flight sensor 102, or both, depending on the embodiment.

In addition, as mentioned previously, the reflectance sensor 104 is useful when the device 100 is determining between an actual face of an authorized user and a picture of the authorized user. For example, without the reflectance sensor 104, it is difficult to distinguish between an actual photo printout or a digital display of the authorized user and the actual face of the user. However, with the reflectance sensor 104, the reflectance characteristics of a paper and a human skin, or the reflectance characteristics of a glass or plastic display (e.g., if a face presented for recognition is shown on a mobile device as stored in a digital picture album, instead of being a live person) will be significantly different, and would protect the user from any spoofing attempts by unauthorized users.

In some embodiments, the ranging sensor 102 may be incorporated with the reflectance sensor 104 as one ranging sensor 102. This ranging sensor 102 may be able to generate a plurality of measurements associated with an object or a user. These measurements may include a distance measurement of the user and a skin reflectance value of the user. The distance that the ranging sensor 102 detects may be within a certain range. While some ranging sensors 102 may be able to detect user presence from a long distance away from the device 100, employing such long-distance ranging sensors for the purpose of facial authentication may not be beneficial, and may consume unnecessary power of the device 100. Accordingly, as previously explained, the ranging sensor 102 may be configured to detect distance measurement of the user within a range between a first presence detection threshold and a second presence detection threshold. Further, the skin reflectance value may also be detected using the ranging sensor 102. The skin reflectance value is a value that differs based on surface characteristics of objects. Objects such as human, mannequin, plastics, or metals all have different surface characteristics, which cause the reflectance value to differ. In one embodiment, surface reflectance or skin reflectance (if the reflected object is a human) may be measurements of albedo, the ratio of reflected light over incident light. In other embodiments, the surface reflectance or skin reflectance may be measured based on other parameters or methods. For example, amplitudes of the reflected signal, wavelength of the reflected signal, ratio of light reflectance and absorption, etc., may be used. The skin reflectance, which indicates the surface reflectance of a human, may be within a certain range almost common to most or all human beings. The skin reflectance value may be between a first reflectance threshold and a second reflectance threshold. The first reflectance threshold is a minimum value of skin reflectance that can be measured from a human skin (e.g., lips, nose, eyes, arms, legs, etc.) and the second reflectance threshold is a maximum value of skin reflectance that can be measured from a human skin. That is, if a light is reflected on a human skin, the detected reflectance value will be between the first reflectance threshold and the second reflectance threshold. A surface reflectance value that is not within this range may indicate that the object is not of human skin, but rather, for example, a mannequin.

When the ranging sensor 102 generates the plurality of measurements (e.g., a plurality of distance measurements, a plurality of skin reflectance value, etc.), a processor of the device 100 outputs a user presence signal in response to the plurality of measurements. This user presence signal is indicative of a user present in the field of view of the ranging sensor 102. For example, the user presence signal may be output when the user is present in the scene as captured by the field of view of the ranging sensor 102. However, the user presence signal may not be output when the user is not present in the scene as captured by the field of view of the ranging sensor 102. The user presence signal may not be output even when the user is present within the field of view of the sensor 102 but is not within a range between the first presence detection threshold and the second presence detection.

In one embodiment, the processor may activate a facial recognition process in response to the user presence signal output by the processor. For example, if the processor determines that the skin reflectance value is of a human being, and the user is within a range between the first presence detection threshold and the second presence detection, minimum required data for initiating the facial recognition process has been met, and the processor will activate the process. Other embodiments of activating the facial recognition process will be explained in connection with FIGS. 3 to 5.

The RGB camera 106 is a camera equipped with a standard complementary metal-oxide semiconductor (CMOS) sensor through which the colored images of persons and objects are acquired. The human eye is sensitive to red, green, and blue (RGB) bands of light, and the general cameras mounted on mobile electronic devices are RGB cameras that capture the same RGB bands, so the images they produce recreate almost exactly what the human eyes see. The RGB camera 106 is also capable of realizing facial recognition by determining the region of interest (ROI) of a human face, detecting the facial characteristics of the face, etc. However, relying on facial authentication using RGB camera 106 may consume significant amounts of power and processing capacity of the electronic device 100. The RGB camera 106 may be located on the first surface 112 of the device 100. In other embodiments, the RGB camera 106 may be located on the opposite side of the first surface 112, and is not necessarily positioned on the same side as the display 114. Yet in other embodiments, the RGB camera 106 may be placed on both the first surface 112 and the opposite surface of the device 100.

The ambient light sensor 108 may be located on the first surface 112 of the device 100. In other embodiments, the ambient light sensor 108 may be located on the opposite side of the first surface 112, and is not necessarily positioned on the same side as the display 114.

An ambient light sensor 108 is a photodetector that is used to sense the amount of ambient light present in the surroundings or scene. For example, the ambient light sensor 108 can be made using phototransistors, photodiodes, or other photonic integrated circuits. In one embodiment, the ambient light sensor 108 senses the lighting changes in the scene or a view captured within the field of view/angle of view of the sensor. That is, the scene may refer to a scene captured within an angle of view of a ranging sensor 102 of the electronic device 100, and may change according to a direction of the ranging sensor 102, camera parameters of the ranging sensor 102 (e.g., focal length, aperture, and the like), and/or movement of the electronic device 100. The scene may include objects (living and non-living), landscapes, and the like.

The ambient light sensor 108 may sense that the ambient light in the scene has changed when an object is near or in front of the device 100. Due to the presence of the object, the object may affect the ambient light in the scene proximal to the device 100. For example, in broad daylight, a shadow of a person may change the ambient light of the scene because of the shadow cast on the device 100. Further, a waving gesture of a person in daylight may cause the change of the ambient light in the scene because of the shadow of the hand being cast on the device 100. The ambient light sensor 108 is capable of detecting a magnitude of the ambient light in the scene, usually measured as the lux value of the light. The ambient light sensor 108 senses that the ambient light has changed when the difference of the magnitude of ambient light exceeds a minimum threshold value. That is, when the ambient light sensor 108 detects that the amount of ambient light changed exceeds the minimum threshold value, the ambient light sensor 108 may send a user presence signal (e.g., a signal based on measurement inputs of ambient light in the scene) to a processor (see FIG. 2) of the device 100 coupled to the ambient light sensor 108, and the processor may conclude that the ambient light has changed in the scene based on the user presence signal. On the other hand, when the ambient light sensor 108 detects that the amount of ambient light changed falls short of the minimum threshold value, the processor will conclude that the ambient light has not changed in the scene based on the user presence signal. However, in some cases where the settings have little or no light, for example at night after sunset or in a dark room with no light, the presence of an object or a person may not be able to be sensed based on the ambient light sensor 108. In these cases, a beam generator 116 may be in use to illuminate light to the scene. In other cases, a ranging sensor 102 in the first mode may be used to detect presence of an object or a person at a dark setting. These will be explained in more detail below.

In some embodiments, as previously mentioned, in a dark setting, the ambient light sensor 108 may not be able to sense that an object is present in a scene. In these settings, the beam generator 116 may be utilized to facilitate the presence detection using the ambient light sensor 108. The beam generator 116 is a light source mounted on the electronic device 100. For example, the beam generator 116 may be a light source made with a light emitting diode (LED), that might be also used as a light flash for taking a picture. This light source can be positioned near the camera of a device or near the ambient light sensor 108, to help illuminate the scene when there is not enough light. For example, in a dark setting where the ambient light sensor 108 cannot detect the change of ambience in a scene despite the presence of an object (e.g., an attempted user of the electronic device 100 who may or may not be authorized to use the device 100), the beam generator 116 flashes the light toward the scene and the object to form a setting that is similar to a bright daylight setting. By briefly flashing the light on the scene, the ambient light sensor 108 may be able to perform the ambient light detection through the assistance of the beam generator 116. The duration of the LED flash using the beam generator 116 may be brief or may be lengthened, based on the processing time for determining that the ambient light has changed or not.

In other embodiments, the ambient light sensor 108 may not use the beam generator 116, and may use the ranging sensor 102. The ranging sensor 102 is capable of detecting face recognizable distance from a scene whether there is light or no light in the scene. In this case, the processor of the device 100 may determine that, instead of using the beam generator 116, it may use the ranging sensor 102 to detect the presence of an object in the scene. A power management circuit which controls the overall operation of the sensors to reduce power usage in the device 100 may deactivate the ambient light sensor 108 and the beam generator 116 once the processor determines that the ranging sensor 102 will have to be used to sense the presence of an object in a scene (e.g., in a dark setting where the ambient light sensor 108 is ineffective). Further detail of the power management circuit will be explained in detail in relation to FIG. 2.

Figure 2:
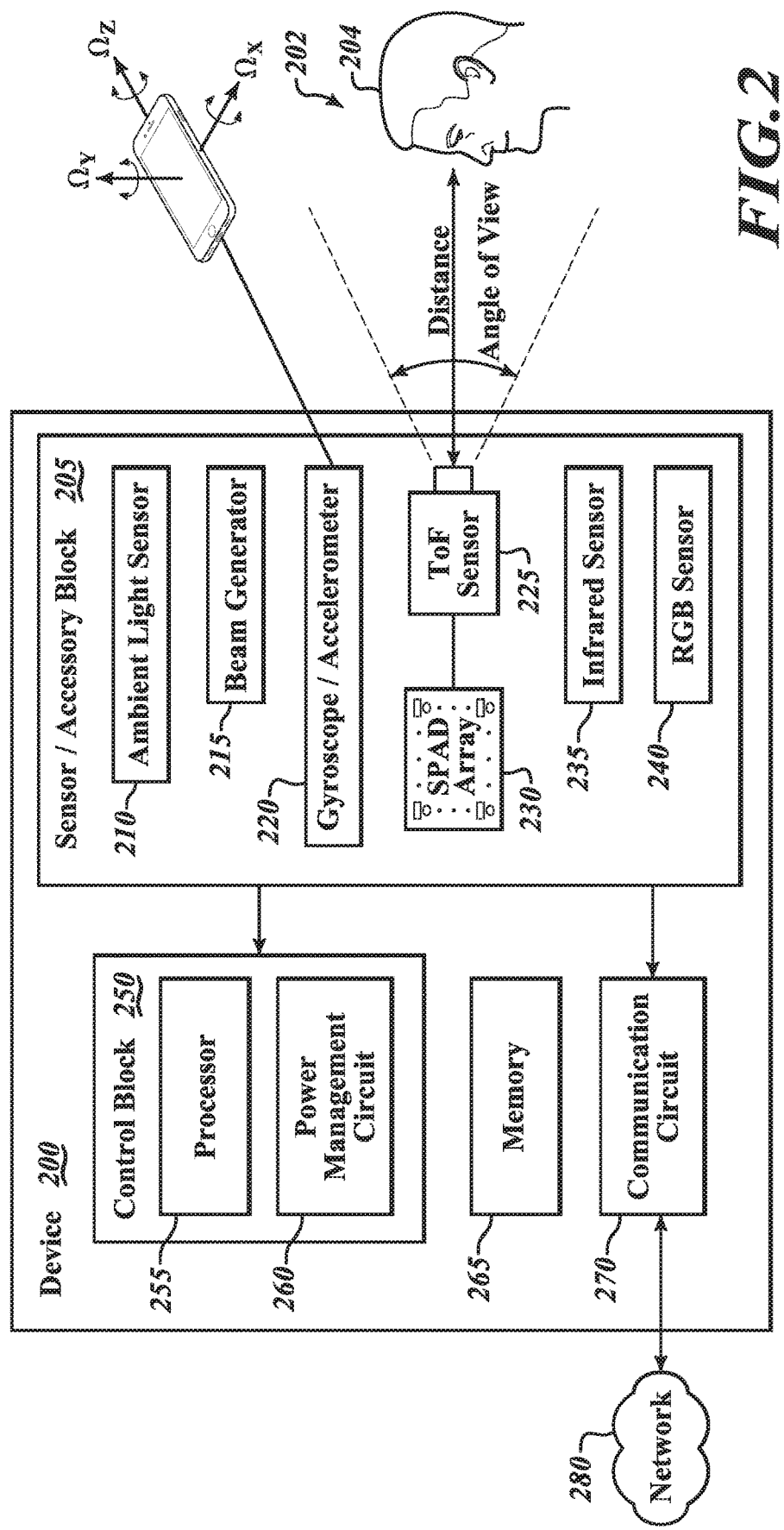
FIG. 2 is a high-level functional block diagram of components of the electronic device, in accordance with one exemplary facial authentication method of the present disclosure.

FIG. 2 is a high-level functional block diagram of components of the electronic device 200 in accordance with one exemplary facial authentication method of the present disclosure. In one embodiment, the electronic device 200 may be identical to the electronic device 100 shown in relation to FIG. 1. The electronic device 200 includes a control block, a sensor/accessory block 205, a memory 265, and a communication circuit 270. In some embodiments, the electronic device 200 may communicate with a server via a network 280 for processing some of the facial authentication data. In other embodiments, the electronic device 200 may include other suitable components, and is not necessarily limited to the components shown in FIG. 2.

The sensor block 205 includes an ambient light sensor 210, a beam generator 215, a gyroscope or an accelerometer 220, a time of flight sensor 225, a SPAD array 230, an infrared camera 235, and an RGB camera 240. The electronic device 200 detects an object 204 in the scene 202 through at least one of the ambient light sensor 210 and the time of flight sensor 225. In other embodiments, motion sensors, audio sensors or other suitable sensors may be used to detect the presence of an object 204 in the scene 202.

The facial recognition process begins by detecting an object 204 in the scene 202. The object 204 may refer to any living or non-living thing. However, for the purpose of detecting and recognizing faces, the object 204 may generally refer to a human. Human may include authorized users or non-authorized users for the purpose of facial authentication. The term "scene" as used herein may refer to a scene 202 captured within an angle of view of a time of flight sensor 225. In one embodiment, the time of flight sensor 225 of the electronic device 200 is used as the ranging sensor 102 of the electronic device 100. The time of flight sensor can detect both distance from an object and the skin reflectance value of the object. The scene 202 may change according to a direction of the lens of the time of flight sensor 225. One benefit of using a time of flight sensor for certain steps of the present method and apparatus over that of a standard RGB camera is that a time of flight sensor does not have a lens focal length, aperture, shutter speed or other parameters common with an RGB camera. Thus, the detection of whether a face is within the recognition distance can be done quickly and many times in a rapid sequence, and yet consume very low power of the system. The scene 202, for the purpose of recognizing human faces 204 (e.g., user's faces), may be narrowed or limited to a predetermined distance and an angle of view, in order to reduce the power consumed by the electronic device 200. This is explained elsewhere in detail herein.

In one embodiment, when a user 204 is present in the scene 202, the time of flight sensor 225 first detects the presence of the user 204. The time of flight sensor 225 operates under at least two modes. In the first mode, the presence detection steps are operated. The first mode allows the time of flight sensor 225 to detect presence, liveliness, motion or gesture by detecting the distance change from the user 204. The time of flight sensor 225 emits lasers or photons to a certain point in the scene 202 and calculates the time when the light signals (e.g., lasers or photons) return back. In some cases, the signals may not reflect back or return back if the lasers or photons do not hit any objects. In one embodiment, the time of flight sensor 225 may have a minimum threshold waiting period for waiting for the reflected signals to return back to the sensor 225. For example, if the lasers or photons do not return back as a reflected signal within the minimum threshold waiting period, a processor 255 may conclude that no object 204 is within a scene 202 and the facial recognition process will not activate. However, if a signal (e.g., lasers or photons) hits a user 204, the signal will reflect back to the time of flight sensor 225 with distance measurements (e.g., distance information on how far the user 204 is from the sensor 225).

The first mode operates at a lower power mode compared to the second mode of the time of flight sensor 225, which operates at a high-power mode. The presence detection under the first mode is performed based on determining the distance of fewer points of the object or the scene than the second mode. The second mode, in operation, detects multiple points of the object or the scene, and creates a depth map of the object based on these multiple distance measurements. In one embodiment, since the first mode is generally used to detect presence of a user, instead of receiving measurements to build a depth map of a user (or more preferably a depth map of a face of a user), the first mode may receive measurements from, for example, a random single point from an object or a scene. On the contrary, the second mode will receive more distance measurement from multiple points, to ensure the generation of a depth map. Due to the differences in the two modes of the time of flight sensor 225, the first mode operates at a low-power mode and the second mode operates at a high-power mode.

The time of flight sensor 225 may also detect a surface reflectance value along with the distance measurements. When a signal emitted from the sensor 225 is reflected, the reflected signal has a different amplitude from the original amplitude depending on which kind of object reflected the emitted signal. The range of the signal amplitudes detected based on different objects vary, and the processor 255 is capable of determining whether the object 204 that reflected the emitted signal is a human or a non-human object based on the change in signal amplitude. Accordingly, the time of flight sensor 225 is capable of measuring distance, as well as surface reflectance. Due to these features of the time of flight sensor 225, in some embodiments, the ranging sensor 102 and the reflectance sensor 104 in FIG. 1 may be incorporated into one time of flight sensor 225. This reduces the size of the camera module incorporated in the electronic device 200.

In other embodiments, the detection of presence may also be done through the ambient light sensor 210. The ambient light sensor 210 may be used alone or in conjunction with the time of flight sensor 225 to detect user presence 204 in the scene 202. First, the ambient light sensor 210 may be used alone to sense user presence 204. In one embodiment, the ambient light sensor 210 is identical to the ambient light sensor 108 in FIG. 1. The ambient light sensor 210 detects the presence of a user 204 by sensing the changes in the ambient light in the scene 202. The ambient light sensor 210 may sense the magnitude of ambient light of the scene 202, and the processor 255 may determine that the difference in the ambient light has exceeded a minimum threshold value for indicating that a user 204 is present in the scene 202. On the other hand, when the ambient light sensor 210 detects that the amount of ambient light changed falls short of the minimum threshold value, the processor 255 will conclude that the ambient light has not changed in the scene 202.

The user 204 may cause the change in ambient light in the scene 202 in various ways. For example, in broad daylight, a shadow of the user 204 may change the ambient light of the scene 202 because of the shadow cast on the device 200. Further, a waving gesture of the user 204 in daylight may cause the change of the ambient light because of the flickering caused by the shadow of the hand cast on the device 200. Contrarily, in some cases where the settings have little or no light, for example at night after sunset or in a dark room with no light, the presence of the user 204 may not be able to be sensed based on the ambient light sensor 210. In these cases, a beam generator 215 may be in use to illuminate light to the scene 202. In one embodiment, the beam generator 215 is identical to the beam generator 116. For example, in a dark setting where the ambient light sensor 210 cannot detect the change of ambience in a scene 202 despite the presence of the user 204, the beam generator 215 flashes the light toward the user 204 to detect the change in ambience light. By briefly flashing the light on the user 204, the ambient light sensor 210 may be able to perform presence detection through the assistance of the beam generator 215 (the beam generator 215 momentarily flashes light on the scene 202 to create a setting that is similar to broad daylight, which allows the ambient light sensor 210 to detect presence in the same way it does when there is enough lighting in the scene 202). The duration of using the beam generator 215 is selected to be sufficient to perform the facial recognition during the presence of the flash. Since the facial recognition is relatively fast, in the millisecond range, the flash can be quite brief as well. The flash can be lengthened based on the processing time for determining that the ambient light has changed or not in the scene 202. The beam generator 215 flashes light in the direction of the field of view of the ambient light sensor 210 or the time of flight sensor 225 when a threshold value for detecting the presence of the user 204 based on the ambient light sensor 210 is below that threshold value. The threshold value is indicative of a minimum value that ensures that a user 204 may be present in the scene 202 (or the field of view) based on the output of the ambient light sensor 210. For example, if the output of the ambient light sensor 210 is below this threshold value, the processor 255 may determine that the user 204 is not present within the field of view 202. On the other hand, if the output of the ambient light sensor 210 is above this threshold value, the processor 255 may determine that the user 204 is present within the field of view 202. The beam generator 215 may be controlled by the processor 255 to flash light when the ambient light sensor 210 is not capable of detecting the user 204 based on the sensed ambient light, and after the scene 202 is illuminated, the ambient light sensor 210 may detect user presence once again. However, if the ambient light sensor 210 is still not able to detect user presence, a time of flight sensor 225 may be used.

Alternatively, in other cases, a time of flight sensor 225 in the first mode may be used to detect presence of the user 204 in a dark setting. In some embodiments, the ambient light sensor 210 may not use the beam generator 215, and may use the time of flight sensor 225. The time of flight sensor 225 is capable of detecting user presence 204 whether there is light or no light in the scene 202. In this case, the processor 255 of the device 200 may determine that, instead of using the beam generator 215, it may use the time of flight sensor 225 to detect the presence of the user 204. A power management circuit 260 which controls the overall operation of the sensors in conjunction with the processor 255 to reduce power usage in the device 200, may deactivate the ambient light sensor 210 and the beam generator 215 once the processor 255 determines that time of flight sensor 225 have to be used to sense the presence of the user 204 (e.g., in a dark setting where the ambient light sensor 210 is ineffective).

For the purpose of recognizing user faces 204, and to reduce power consumption in the electronic device 200, as mentioned briefly above, the distance that the time of flight sensor 225 has to detect may be narrowed or limited to a predetermined distance. The predetermined distance may refer to a distance that is within a range of a first presence detection threshold and a second presence detection threshold. The first presence detection threshold refers to a minimum distance that enables the time of flight sensor 225 to initiate facial recognition of a user. The second presence detection threshold refers to a maximum distance that enables the time of flight sensor 225 to perform facial recognition of a user. The predetermined distance may also be referred to as a face recognizable distance as mentioned in relation to FIG. 1. For example, a user's face that is placed closer than the first presence detection threshold (e.g., too close to the electronic device 200 or the lens of the time of flight sensor 225), will not be within the angle of view of the sensor 225, and facial detection will not be possible to make out the entire face of the user 204. On the other hand, the user's face may be placed beyond the second presence detection threshold (e.g., too far from the electronic device 200 or the lens of the time of flight sensor 225). In this case, the user's face may not be able to be detected due to the remote distance from the electronic device 200. If the distance is too remote, the sensor 225 may not be able to build a depth map of the face of the user 204 even though the user 204 may be within an angle of view of the sensor 225.

In some embodiments, a first presence detection threshold and a second presence detection threshold for the first mode and the second mode may be identical. However, in other embodiments, a first presence detection threshold and a second presence detection threshold for the first mode may be different than the second mode. This stems from the fact that the first mode is for presence detection (e.g., the first mode can detect user presence that is beyond a distance capable of generating a depth map of a user's face), and the second mode is for facial recognition by use of creating a depth map of the face of the user.

Once the user presence 204 is detected based on the use of the sensors (e.g., ambient light sensor 210, motion sensors, audio sensors, accelerometer 220, time of flight sensors 225), the second mode of the time of flight sensor 225 receives multiple measurements by detecting multiple points of the user 204. In performing detection, the time of flight sensor 225 uses single-photon avalanche diode (SPAD) arrays 230. The SPAD array 230, including a large number of SPAD cells (not shown), receives a returned optical signal/optical pulse signal (e.g., lasers or photons or the like) via the lens of the time of flight sensor 225. Each SPAD cell includes a SPAD for sensing a photon of the return optical signal. Each SPAD cell in the return SPAD array 230 provides an output pulse or SPAD event when a photon in the form of the return optical signal is detected by that cell in the return SPAD array 230. A delay detection circuit included in the processor 255 determines a delay time between transmission of the transmitted optical signal, as sensed by a reference SPAD array (not shown), and a SPAD event detected by the return SPAD array 230. The SPAD event detected by the return SPAD array 230 corresponds to receipt of the return optical signal at the return SPAD array 230. In this way, by detecting these SPAD events, the delay detection circuit and the processor 255 estimates an arrival time of the return optical signal. The processor 255 then determines the time of flight based upon the difference between the transmission time of the transmitted optical signal, as sensed by the reference SPAD array, and the arrival time of the return optical signal, as sensed by the SPAD array 230, thereby calculating a distance from the user 204 from the sensor 225. In addition, the SPAD array 230 may have various array zones for detecting multiple points of distance from the user 204. These multiple array zones in the SPAD array 230 of the sensor 225 allow multiple, simultaneous detection of distance measurements at plurality of points of the user 204, which then can be output to the processor 255 for creating a depth map of the face of the user 204.

In other embodiments, the user presence 204 can be detected by the gyroscope of accelerometer 220 incorporated in the device 200. The gyroscope/accelerometer 220 has three axes of angular rotation detection $\Omega_x$, $\Omega_y$, and $\Omega_z$, each orthogonal to one another. The accelerometer 220 may output turn angles in a three dimensional direction or coordinate for pitch (look up/down), yaw (rotate), and roll (tilt) to the processor 255. The processor 255, based on any tilt, rotation, or change in orientation sensed will determine that a user 204 is present, and may activate the facial recognition process.

The electronic device 200 may include an infrared sensor 235. The infrared sensor 235 is an electronic instrument that is used to sense certain characteristics of its surroundings through emitting or detecting infrared radiation. Infrared sensor 235 may be incorporated into infrared cameras capable of measuring the heat being emitted by an object and detecting motion.

The infrared sensor 235 may be used to prevent spoofing by using a picture of a user to pass through the facial authentication process with an approved recognition, even though the actual face of living person is not present before the sensor. For example, in prior art where no time of flight sensors are, infrared sensors are utilized, and the facial authentication process can be deceived by a mere picture of the face of the authorized user. However, the heat emission measured from a digital or analog picture will not have the same heat emission pattern as a real human. Accordingly, by using an infrared sensor 235, an attempt to fraudulently circumvent the facial authentication process can be prevented.

In one embodiment, the infrared sensor 235 may be used in conjunction with the time of flight sensor 225 to prevent fraudulent facial authentication attempts, which will be explained in more detail later on.

The electronic device 200 may include an RGB sensor 240. The RGB sensor 240 may be implemented in the form of an RGB camera. In one embodiment, the RGB sensor 240 of device 200 is identical to the RGB camera 106 of device 100. The RGB sensor 240 utilizes a CMOS sensor and captures the RGB bands most sensitive to the human eye, so that the images the RGB sensor produces recreate the colored images almost exactly as what the human eyes see. The RGB sensor 240 is capable of authenticating a user's face by detecting the ROI of a human face, detecting the facial characteristics of the face, and determining the substantial similarity of the detected facial characteristics with those of the authorized user stored in the database. In one embodiment, the RGB sensor 240 may initially capture at least one image of a face of the user 204 within the face recognizable distance. Once the RGB sensor 240 captures at least one image of a face of the user 204, the sensor 240, in conjunction with the processor 255, performs face recognition on the at least one image of the face of the user 204. The RGB sensor 240 may generate recognition parameters for the face of the user based on the face recognition performed on the at least one image of the face of the user 204. The recognition parameters may include, for example, but are not limited to, the 2-dimensional (e.g., x, y coordinates) or 3-dimensional (e.g., x, y, z coordinates if the images are captures in the form of a depth map) of the unique landscapes of the face (e.g., lips, ears, eyes, nose, eye brows, ridges and valleys on the surface of the skin, etc.), the shapes of facial figures (e.g., lips, ears, eyes, nose, eye brows, ridges and valleys on the surface of the skin, etc.), the locational relationships and actual distance between the facial figures, and the measured distances from the surface of the face and the various facial figures. The processor 255 may then determine the face of the user in the at least one image is associated with a face of an authorized user, based on at least one of the recognition parameters, the skin reflectance value and the face recognizable distance.

Facial authentication process using RGB sensor 240 may consume significant amounts of power and processing capacity of the electronic device 200. In one embodiment of the present disclosure, other sensors such as ambient light sensor 210 and time of flight sensor 225 are used in conjunction with the RGB sensor 240 to reduce power consumption in the device 200.

The control block 250 includes a processor 255 and a power management circuit 260. Other suitable processing circuitry may be included in order to perform facial authentication process, and the elements of the control block 250 are not necessarily limited to the processor 255 and the power management circuit 260.

The processor 255 and the power management circuit 260 receive the plurality of measurements from the sensor/accessory block 205 as inputs. The plurality of measurements includes all measurements received from the ambient light sensor 210, the beam generator 215, the accelerometer 220, the time of flight sensor 225, the SPAR array 230, the infrared camera 235, and the RGB camera 240. Examples of measurements include distance measurements of various points of the user 204, surface reflectance measurements of the surface of the user 204, the degree of ambient light in the scene 202, tilt/orientation measurements (e.g., pitch, yaw, and roll, etc.) of the electronic device 200, etc. The processor 255 may receive measurements from the sensors as a user presence signal (e.g., ambient light change measurements from the ambient light sensor 210 indicating user presence, distance change measurements from the time of flight sensor 225 indicating user presence, and the tilt/orientation change measurements from the accelerometer 220 indicating user presence, etc.), and may initiate the facial recognition process of the electronic device 200 by sending wake-up signals or activation signals to, for example, the RGB sensor 240 or the second mode of the time of flight sensor 225.

In some embodiments, the processor 255 determines that a user 204 is present at the scene 202 based on comparing the outputs from the ambient light sensor 210 with a minimum threshold value. The minimum threshold value may indicate the minimum ambient light change in order to ensure that a user 204 is present. Further, the processor 255 may flexibly recalculate or readjust the minimum threshold value depending on the setting of the scene 202 or the amount of light detected based on the field of view. For example, the minimum threshold value may be set based on considering, but not limited to, the average amount of light in a scene 202 for a predetermined period, the frequency of change in the ambient light in the scene 202, or the amount of difference or fluctuation in ambient light in a given interval. For example, when a user is walking while the user 204 has his/her mobile phone in his/her pocket, the ambient light sensor 210 may detect no light for a certain period until the user 204 takes the phone out from his/her pocket. In this case, the ambient light sensor 210, in conjunction with the processor 255, may calculate the average amount of light in a scene 202 for a predetermined period, and set a lower minimum threshold value in this setting, because a slight change or fluctuation in light may indicate user presence (e.g., taking the phone out from the user's pocket which will show significant change in ambient light within a given interval of time).

In other embodiments, the second mode of the time of flight sensor 225 detects multiple distance measurements within the face recognizable distance of the user 204 from the time of flight sensor 225. In response to receiving the multiple distance measurements, the processor 255 generates a depth map of the face of the user 204 based on the multiple distance measurements. The processor 255 also generates recognition parameters for the face of the user based on the depth map. The recognition parameters may include, for example, but is not limited to, the 2-dimensional coordinates (e.g., x, y coordinates) or 3-dimensional coordinates (e.g., x, y, z coordinates) of the unique landscapes of the face (e.g., lips, ears, eyes, nose, eye brows, ridges and valleys on the surface of the skin, etc.), the shapes of facial figures (e.g., lips, ears, eyes, nose, eye brows, ridges and valleys on the surface of the skin, etc.), the locational relationships and actual distances between the facial figures, and the measured distances from the surface of the face and the various facial figures. The processor 255 may then determine the face of the user is associated with a face of an authorized user based on at least one of the recognition parameters, the depth map of the face of the user, the skin reflectance value, and the face recognizable distance. In other embodiments, the processor 255 may compare the authorized user and the face of the user based on the depth map and the recognition parameters, and determine the authorized user substantially matches the depth map of the face of the user when the match exceeds a predetermined threshold. The predetermined threshold may refer to a threshold value that indicates a comparison score or a value based on the correlation between two data. For example, if the face of the user captured is compared with those of the authorized user, and the comparison score based on the similarities of facial characteristics expressed in numbers is above a certain score (e.g., a score that ensures the same identity with, for example, 90%-99% probability), the processor 255 may determine that the user is the authorized user. In further examples, the image or the depth map of the face of the user may be compared with the pre-stored image or depth map of the authorized user. The processor 255 may then perform any suitable correlation method between the two images or the two depth maps to produce a correlation value indicative of similarities of facial characteristics in numbers. If the correlation value is above a certain value (e.g., a value that ensures the same identity with, for example, 90%-99% probability), the processor 255 may determine that the user is the authorized user.

When the processor 255 determines that the detected face of the user exceeds the predetermined threshold, the electronic device 200 which was in a first state (e.g., the device is locked and is inaccessible without a pin code) may change its state to a second state (e.g., the device is unlocked and accessible). However, if the processor 255 determines that substantial similarity of the face of the user and the authorized user does not exceed the predetermined threshold, the device 200 may be maintained in the first state, and stay locked or prompt the user 204 with a PIN code request.

In addition, the processor 255 may include or otherwise access computer-readable instructions, such as algorithms, code, or the like, which configures the processor 255 to perform one or more of the operations that will be described with respect to methods 300, 400 and 500.

In the first phase of the facial authentication process, user presence needs to be detected before imitating the authentication process. In one embodiment, the user 204 may simply lift or touch the device 200, and the touch event or the tilt sensed by the gyroscope 220 may initiate the facial authentication process. However, in other embodiments, this first phase is performed using the ambient light sensor 210 to detect user presence. Other than the user directly indicating presence by touching the device 200, using only the ambient light sensor 210 to detect user presence may consume the lowest power. When the ambient light sensor 210 senses ambience change, the ambient light sensor 210 may transmit the input information along with an interrupt signal to the processor 255 and the power management circuit 260. The interrupt to the processor 255 from the sensor 210 indicating an event (e.g., an event indicating user presence in the scene) may be sent, and the power management circuit 260 may deactivate the rest of the sensors, including time of flight sensors 225, infrared sensors 235, and RGB sensors, 240 to limit power consumption in the device 200. If the other sensors were already under an inactive state or a sleeping state, the power management circuit 260 may maintain that state in order not to unnecessarily activate the sensors.

Based on the input from the sensors in the sensor block 205, the power management circuit 260 may provide activate and deactivate signals to the sensors to optimize and reduce the power consumed in the process of facial authentication in the device 200. During this low-power state, the ambient light sensor 210 is the only sensor in an active state, and senses ambient light change in the scene 202 to detect whether a user 204 is present. In settings where there is not enough light to sense the changes in ambient light, the power management circuit 260 may activate the beam generator 215. The duration of the use of beam generator 215 (e.g., how long the light should be flashed toward the direction of the user 204 in the scene 202) may be controlled by the power management circuit 260, to reduce the usage of power. If the power management circuit 260 determines that additionally using the beam generator 215 to assist the ambient light sensor 210 in detecting user presence needs more power consumption than using the first mode of the time of flight sensor 225, the power management circuit 260 may deactivate the beam generator 215 and the ambient light sensor 210, and activate the time of flight sensor 225 to detect user presence. In this case, the power management circuit 260 may only activate the time of flight sensor 225 operating under the first mode, and deactivate or maintain sleep state for the second mode of the time of flight sensor 225 (which consumes more power and is generally used for generating depth maps of user faces).

The power management circuit 260 may weigh the amount of power expected to be consumed between the ambient light sensor 210 with the beam generator 215 and the time of flight sensor 225. The power management circuit 260 may retrieve the average normal power consumed for detecting user presence in a scene under the first mode of the sensor 225 from the memory 265. The power management circuit 260 may calculate the power used by the ambient light sensor 210 and the additional power that may be used by the beam generator 215 to detect user presence. By comparing the level of power consumption between these two sensors, the power management circuit 260 may determine which sensor combination is more fit for detecting user presence, as well as for achieving low power consumption.

After a user presence is detected, the second phase of the facial authentication process may be performed by detecting the face of the user. In one embodiment, the power management circuit 260 may wake up and activate the RGB camera 240 to detect the face of the user. Before activating the RGB sensor 240, the power management circuit 260 deactivates the rest of the sensor to avoid unnecessary power consumption. The RGB sensor 240 performs facial authentication by analyzing an image of the scene 202 including the user 204, detecting the ROI of the image to find the face of the user 204, detecting the facial characteristics of the user 204, and determining the substantial similarity of the detected facial characteristics with those of the authorized user stored in the memory 265. The facial authentication process involving the RGB sensor 240 may require more steps than the aforementioned processes. Accordingly, the RGB sensor 240 requires significant amount of image processing capacity of the electronic device 200, which thereby consumes significant amount of time and power during the facial authentication process.

In other embodiments, the power management circuit 260 may wake up and activate the second mode of the time of flight sensor 225. Before activating the second mode of the time of flight sensor 225, the power management circuit 260 deactivates the rest of the sensor, including the RGB sensor 240 and the IR sensor 235, to avoid unnecessary power consumption. When the power management circuit 260 only activates the second mode of the time of flight sensor 225, the sensor 225 receives distance measurements from the multiple points in the multiple zones of the user 204. The sensor 225 transmits these distance information, depth map information, and facial characteristics information (e.g., the location of the lips, eyes, nose, eyebrows, ears, the uniqueness of the shape of the lips, eyes, nose, eyebrows, etc.) to the processor 255, and the processor 255 builds a face depth map. In other embodiments, the sensor 225 may generate the face depth map and transmit the face depth map information to the processor 255. In another embodiment, the sensor 225 may relay the distance information, depth map information, and facial characteristics information to the communication circuit 270, so that the generation of the face depth map be done over a cloud, through the network 280. This way, the device 200 may not consume as much power as it has to for image processing the various facial data.

Figure 3:
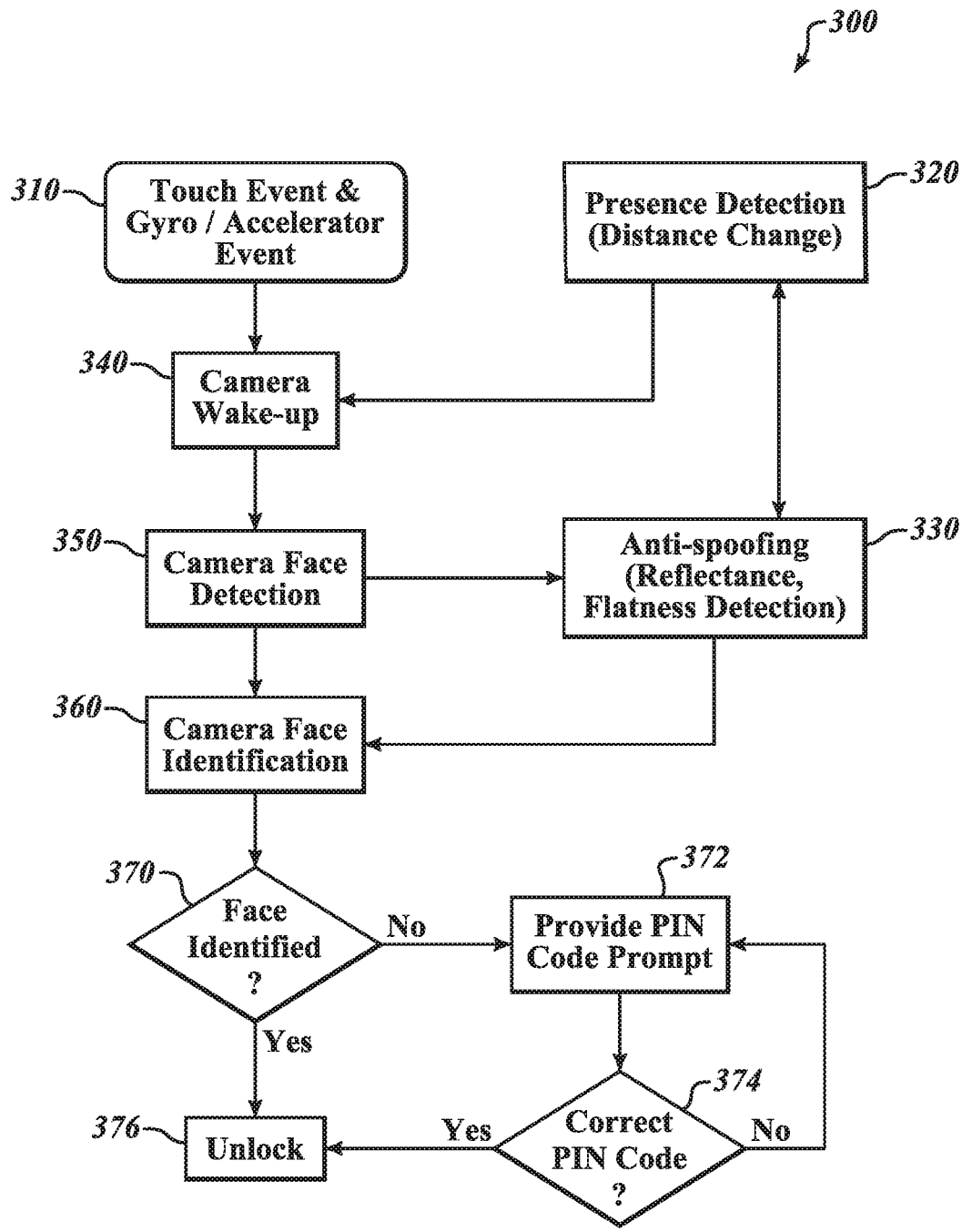
FIG. 3 is a flowchart illustrating a facial authentication method, in accordance with one embodiment of the present disclosure.
Figure 4:
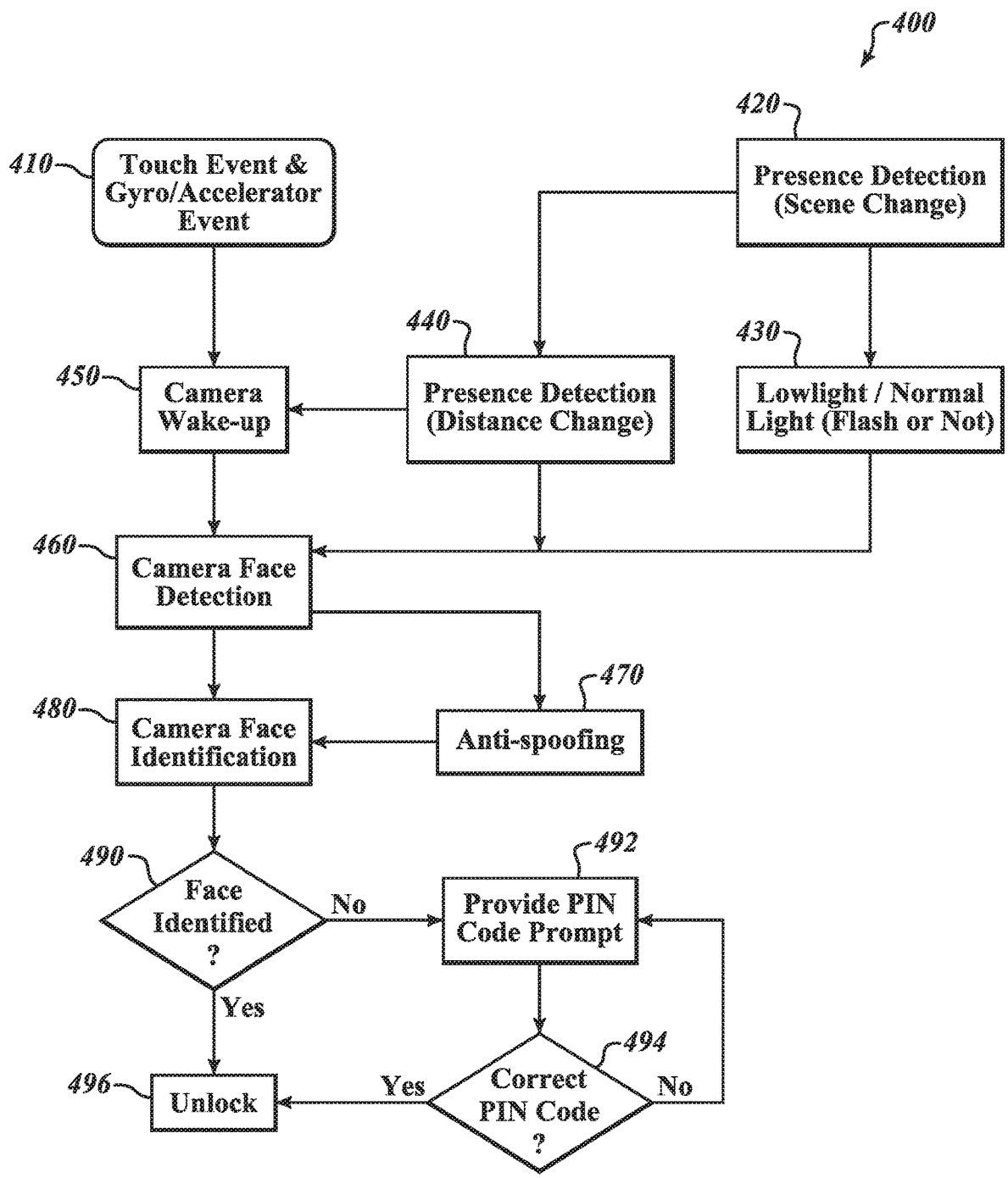
FIG. 4 is a flowchart illustrating a facial authentication method, in accordance with another embodiment of the present disclosure.
Figure 5:
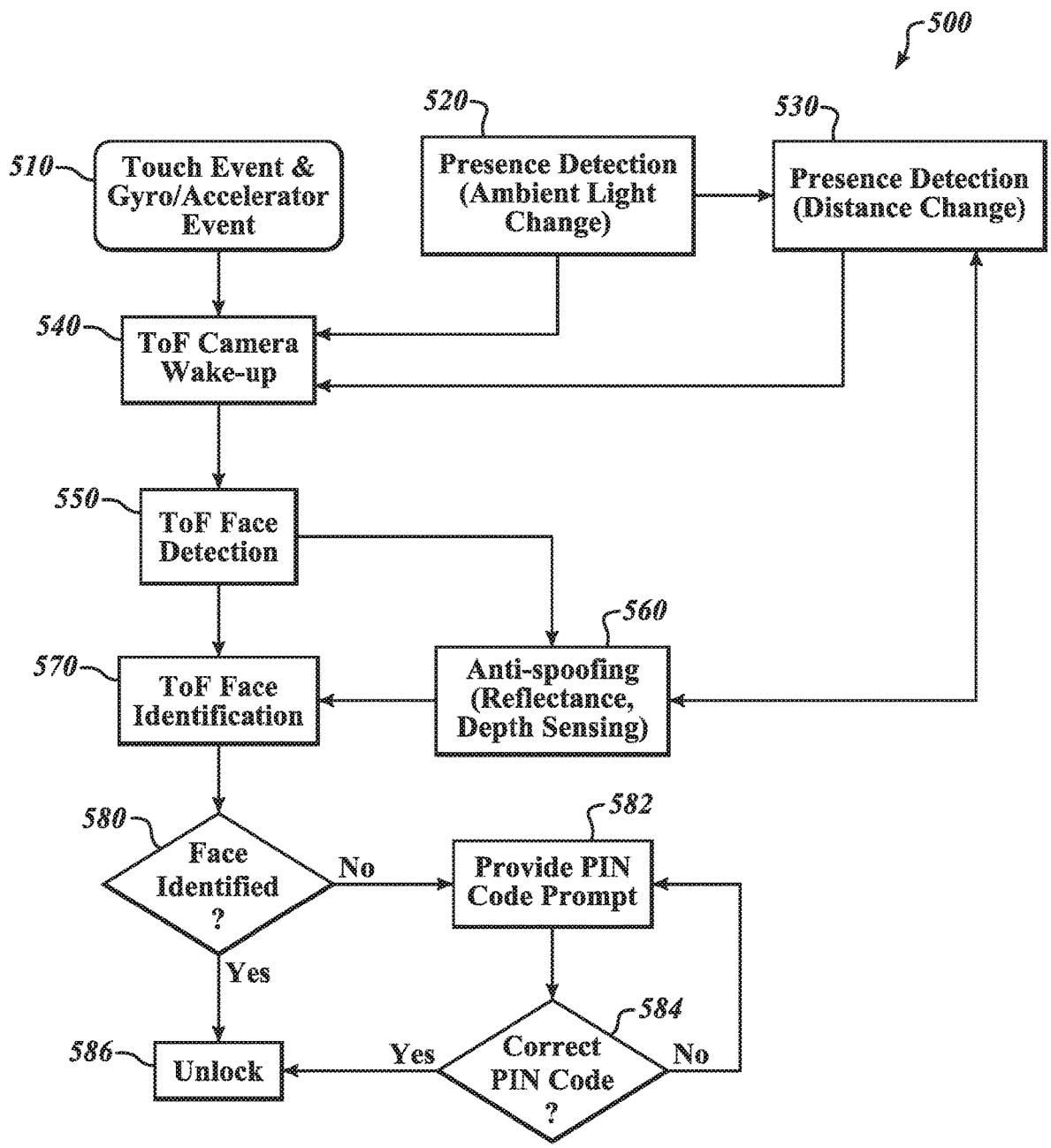
FIG. 5 is a flowchart illustrating a facial authentication method, in accordance with another embodiment of the present disclosure.

The various ways that the power management circuit 260 manages the power consumption in the device 200 will be dealt in more detail in connection with the facial authentication methods set forth in FIGS. 3 to 5.

The processor 255 may be any suitable processor, processing unit, or circuitry capable of managing and/or operating the electronic device 200, such as an application processor (AP), central processing unit (CPU), digital signal processor (DSP), etc. The processor 255 receives signals or interrupts from one or more hardware components, sections, parts, or circuitry within the device 200. The processor 255 executes processes, instructions, procedures, subroutines, or the like (e.g., program code, microcode, etc.). In one embodiment, processor 255 processes the various data from the sensor/accessory block 205 for the facial authentication process in the device 200. For example, the processor 255 computes and generates a face depth map of the user according to the received surface reflectance data, distance measurement data, depth map information, and facial characteristics information.

The processor 255 also works with the power management circuit 260 to control the power flow to various sensors within the sensor block 205. Based on the activate and deactivate signals generated from the power management circuit 260, the power management circuit 260 directly sends command instructions to the sensors for activation and deactivation. In some embodiments, the processor 255 may receive the necessary power information from the power management circuit 260, and send the activate and deactivate signals to the sensors. For example, in the beginning of the facial authentication stage, the processor 255 may enable an active signal and only activate the ambient light sensor 210. If a user presence is detected based on the ambient light sensor 210, the processor 255 may deactivate the ambient light sensor 210 and activate the second mode of time of flight sensor 225 for creating depth map of the face of the user. The processor 255 may later on retrieve the pre-stored face of the authorized user from memory 265 and compare the detected face based on the depth map and determine whether the face matches the authorized user. The processor 255 may then send instructions to the device 200 to unlock the display screen and grant access to the device 200.

In other embodiments, in the beginning of the facial authentication stage, the processor 255 may first enable an active signal, and only activate the ambient light sensor 210. However, if a user presence is unable to be detected based on the ambient light sensor 210, the processor 255 may deactivate the ambient light sensor 210 and activate the first mode of time of flight sensor 225 to detect a user presence first, before activating the second mode. If it is clear that a user is present, the processor 255 may deactivate the first mode and activate the second mode for creating depth map of the face of the user. The processor 255 may then later on proceed with the facial authentication process.

The power management circuit 260 oversees the overall power usage within the sensors related to the facial authentication process. The power management circuit 260 may send activate and deactivate signals to the sensors for waking up the sensors from a sleep state to an active state. The circuit 260 may also send deactivate signals to the sensors to transfer the state from an active state to an inactive state (or a sleep state). In some embodiments, some functions of the power management circuit 260 may be handled by the processor 255. Other various operations in the device 200 are handled by the processor 255, and the processor 255 controls other miscellaneous operations for controlling sensors that are not handled by the power management circuit 260.

The memory 265 may be configured to store the various sensor information detected from the sensors. For example, the ambient lighting data of the scene 202 detected from the ambient light sensor 210, the inertia data, positional data from the gyroscope 220, surface reflectance data, distance measurement data, depth map information, facial characteristics information from the time of flight sensor 225, heat map data of the user and the scene from the IR sensor 235, and image frames received from the RGB sensor 240 may be stored in the memory 265. The memory 265 may also store the camera parameters and location information, which may include camera parameters such as a focal length, a direction, ISO, shutter speed, aperture, etc., of the RGB camera and other cameras in the device 200. The memory 265 may also store face information of the authorized user and may be retrieved by the processor 255 to compare whether the detected face of a user matches the face of the authorized user. The memory 265 may be a local storage, and may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive).

The electronic device 200 may communicate wirelessly with servers or network 280 via the communication unit 270, which may employ any suitable wireless communication scheme such as Wi-Fi, WiMAX, Bluetooth, or any other wireless communication technologies (e.g., 4G, 5G, etc.) capable of wirelessly transmitting data. By using the communication unit 270, the processing of the sensor data does not necessarily have to be performed within the device 200, and this may reduce the power consumption involved in the image processing.

FIG. 3 is a flowchart illustrating a facial authentication method, in accordance with one embodiment of the present disclosure. The method 300 may be performed, for example, by an electronic device 200 having a time of flight sensor 225 and an RGB sensor 240. This method 300, according to one embodiment of the present disclosure, may not utilize a second mode of the time of flight sensor 225 or the ambient light sensor 210. The method 300 begins with the electronic device 200 in a "locked" state or "signed out" state (e.g., inaccessible for using the electronic device 200 unless authenticated).

At block 310, the method 300 includes detecting a touch event or a gyroscope/accelerator event. The user presence may be detected by the most basic event, a user initiating contact with the device 200. A touch sensor in the electronic device 200 may detect a touch event by the user (e.g., the user attempting to unlock the device 200 by touching or pressing any part of the display or the housing 110 of the device 200). In addition, a gyroscope or an accelerometer 220 may detect the tilt/orientation changes caused by the user (e.g., the user lifting up the device 200 for use). Either a touch event or a gyroscope/accelerator event may indicate a presence of the user. In some cases, the touch event and the gyroscope/accelerator event can happen concurrently, in which case both of these actions will trigger the waking of the camera. If user presence is detected, in some cases, the method 300 will proceed to block 340, without undergoing steps at block 320.

At block 320, the method 300 includes detecting a distance change in a scene. When there is no touch event or gyro/accelerator event, the user presence may be detected by using a time of flight sensor 225 operating under a first mode. In one embodiment, only the first mode of the time of flight sensor 225 may be used to detect distance change in the scene to detect user activity or user presence. The power management circuit 260 may keep the first mode of the time of flight sensor 225 activated but may deactivate other sensors, or otherwise maintain sleep mode for other sensors that does not need to be utilized in the face authentication process. For example, the RGB sensor 240 and the infrared sensor 235 may be kept at a deactivated state until it needs to be used in the authentication process. Meanwhile, when a distance change is detected, this may indicate that a user is present in the scene. For example, the user may not have been previously present in the scene. However, as the user comes within the scope of the angle of view of the time of flight sensor 225 and within a certain range of distance (e.g., face recognizable distance), the sensor 225 may detect a change in distance between the sensor 225 and the scene due to the user in between. In some embodiments, the first mode of the time of flight sensor 225 may also detect the liveliness of the user. The sensor 225 may detect the various gestures or motions of the person to ensure that the person is present in the scene. For example, a user may briefly show up at the scene, but the user may move away from the angle of view of the sensor 225, because that person could be a random passerby and has no intention of using the device 200. In this case, unless it is further confirmed that a user is really attempting to unlock the electronic device 200, a processor will not wake up an RGB camera 240 (at block 340) based on inputs from the sensor 225, in order not to consume unnecessary power of the device 200. If the person stays in the scene and makes gesture within the angle of view of the sensor 225 by waving its hand or moving in front of the sensor 225, user presence may be confirmed, and the method 300 proceeds to block 340 to wake up the RGB camera 240.

At block 340, the method 300 includes waking up or activating the RGB camera 240. Upon the presence detection from the time of flight sensor 225, the sensor 225 may output signals including the sensed data to the control block 250 including the processor 255 and the power management circuit 260. The power management circuit 260 may deactivate the first mode of the time of flight sensor 225 since user presence has been confirmed, and activate the RGB camera 240 for face detection. In other embodiments, the processor 255 may receive the outputs from the sensor 225 and send instructions to the RGB sensor 240 via the power management circuit 260, that facial detection using RGB sensor 240 needs to be initiated. In this embodiment, the RGB camera 240 needs to be employed because the facial authentication process requires high-level sensors, and the first mode of the time of flight sensor 225 may not be sufficient to perform this function. An exemplary method utilizing the second mode of the time of flight sensor 225 without any use of RGB sensor 240 and IR sensor 235 will be explained in connection with FIG. 5.

After the RGB camera 240 is woken up at block 340, the method 300 proceeds to block 350. At block 350, the method 300 includes detecting a face of the user using the RGB camera 240. The RGB sensor 240 detects the user's face by detecting the ROI of a human face, detecting the facial characteristics of the user (e.g., the location of the lips, eyes, nose, eyebrows, ears, the uniqueness of the shape of the lips, eyes, nose, eyebrows, etc.), and may create a face map based on the sensed information. Once this process is completed, the method 300 may proceed to block 360 or undergo an anti-spoofing process at block 330 before proceeding to block 360.

At block 330, the method 300 includes providing anti-spoofing steps using the first mode of the time of flight sensor 225. The time of flight sensor 225 also receives surface reflectance information of the user when receiving distance measurements. By using these measurements (e.g., reflectance measurement and distance measurement), providing a fraud-proof system with a time of flight sensor 225 is possible. Conventional art used IR cameras 235 to detect infrared reflectance to detect whether the face of the user was an actual face or just a picture of the user. However, the power management circuit 260 without activating the IR camera 235 to check fraudulent face authentication attempts may activate the first mode of the time of flight sensor 225, which consumes significantly less power in performing the fraud check. In other embodiments, this anti-spoofing step may be used in connection with the step at block 320. If the anti-spoofing process of block 330 was performed concurrently with the step at block 320, or shortly after or before block 320 but before waking up the camera at block 340, the method 300 may proceed from block 350 to block 360 without undergoing the anti-spoofing process at block 330. In other embodiments, the detection of reflectance measurement (e.g., surface reflectance, skin reflectance value, etc.) may be performed together with block 320. In this embodiment, the skin reflectance value and the distance measurement (e.g., face recognizable distance) may be detected at the same time, using the time of flight sensor 225. If the skin reflectance value is within a first reflectance and a second reflectance threshold, and the distance detected is within a face recognizable distance as defined as being between a first presence detection threshold and a second presence detection threshold, this may activate the facial authentication process by proceeding the method 300 to block 340 or 350. That is, a facial authentication process may activate in response to the face recognizable distance and the skin reflectance value, and the RGB camera 240 may be awakened at block 340 or initiate facial detection using the RGB camera 240 at block 350.

At block 360, the method 300 includes identifying the user's face with the pre-stored face of the authorized user. The processor 255 may retrieve the face information of the authorized user from the memory 265 and compare the face with the information sensed using the RGB camera 240. If the processor 255 determines at block 370 that the matching level exceeds a minimum threshold for ensuring that the faces are substantially the same face of the authorized user, the method 300 may proceed to block 376 and the processor 255 may unlock the device 200.

However, if the processor 255 determines that the face of the user does not exceed the minimum threshold at block 370, then the method 300 will proceed to block 372 and the processor 255 will prompt the unidentified user with a request to enter a personal identification number (PIN) code for the device 200. If the user enters an incorrect PIN code at block 374, the processor 255 may send instruction signals to reject access to the device 200 and prompt the user again to provide a correct PIN code at block 372. If the user provides a correct PIN code at block 374, the processor may send instructions to unlock the device 200 and accordingly the device 200 will be unlocked at block 376. In some embodiments, if the user attempts to open the device 200 again trying to use the face authentication process at blocks 350, 360, instead of using the PIN code at block 372, the authentication step may flow back to block 350 for another check. However, if the user still fails to authenticate himself using the face detection/recognition process, the user will be prompted with the PIN code to verify himself.

FIG. 4 is a flowchart illustrating a facial authentication method, in accordance with one embodiment of the present disclosure. The method 400 may be performed, for example, by an electronic device 200 having an ambient light sensor 210, a beam generator 215, a time of flight sensor 225, and an RGB sensor 240. This method 400 utilizes the ambient light sensor 210 and the beam generator 215 in detecting user presence, and the other steps may be substantially identical to the steps explained in relation to method 300. Similar steps will be omitted in order not to provide repetitive explanation. The method 400 begins with the electronic device 200 in a "locked" state or "signed out" state.

At block 410, the method 400 includes detecting a touch event or a gyroscope/accelerator event. This is similar to the step block 310 of the method 300.

At block 420, the method 400 includes detecting an ambient light change in a scene. When the ambient light sensor 210 detects a change in the ambient light in the scene, processor 255, based on the outputs from the sensor 210, determines that a user is present at the scene. In one embodiment, if the ambient light change is beyond the threshold amount for the processor 255 to determine that a user is present, the processor 255 will signal the power management circuit 260 so that the ambient light sensor 210 is deactivated, and wakes up the RGB camera 240 at block 450, so that the method 400 proceeds to block 450.

In some embodiments, the ambient light change may not be beyond the threshold amount for the processor 255 to determine that a user is definitely present, and further ways of confirming user presence may be employed. In this case, in order to make sure that a user is present, the method 400 may proceed to block 440 to use the first mode of the time of flight sensor 225 to detect distance changes caused by the user. The sensor 225 may detect liveliness, motions, and gestures of the user based on distance change. During this step, the power management circuit 260 may activate the first mode of the time of flight sensor 225, and deactivate the ambient light sensor 210. In some embodiments, instead of using the first mode of the time of flight sensor 225, the method 400 may proceed to block 430 and utilize the beam generator 215 to compensate for lack of lighting in the scene. If the processor 255 determines that the ambient light change does not exceed the minimum threshold to ensure that user is present in the scene, the processor 255 will transmit signals, commands, and instructions to the power management circuit 260 so that the power management circuit 260 activates the beam generator 215 to provide a brighter setting in the scene. The beam generator 215 will then assist the ambient light sensor 210 in detecting presence based on ambience change. The power management circuit 260 may weigh which route may consume the least amount of power in the device 200. The power management circuit 260 will determine based on various factors including but not limited to, the duration of time the beam generator 215 will illuminate the scene, the power needed for the first mode of the time of flight sensor 225 to detect presence in the scene, the amount of ambient light in the scene, and the amount of additional light needed by the beam generator 215 to ensure user presence detection based on the ambient light sensor 210, etc. If a user presence is confirmed at block 420, 430, or 440, the method 400 proceeds to block 450. In some embodiments, the power management circuit 260 may activate a facial detection mode of the RGB camera 240 concurrent with the output of the user presence signal, so that the method 400 proceeds to block 460 from block 430 or 440.

At block 450, the method 400 includes waking up the RGB camera 240. This is similar to the step block 340 of the method 300.

At block 460, the method 400 includes detecting a face of the user using the RGB camera 240. This is similar to the step block 350 of the method 300.

After block 460, the method 400 may proceed to block 470 for the anti-spoofing step, or proceed to block 480 for identifying the user's face with the pre-stored face of the authorized user.

The anti-spoofing step at block 470 is similar to the step at block 330 of the method 300. The first mode of the time of flight sensor 225 may use surface reflectance information and distance measurements to detect reflectance and flatness of the user. By using these measurements (e.g., reflectance measurement and distance measurement), the time of flight sensor can provide a fraud-proof facial recognition system. The step at block 470 may be performed in connection with blocks 420, 430 and 440, and if anti-spoofing step was previously performed, the method 400 may proceed directly to block 480 after block 460. In some embodiments, the anti-spoofing step may be combined with steps block 440, and the skin reflectance value and the distance measurement (e.g., face recognizable distance) may be detected at the same time using the time of flight sensor 225. That is, a facial authentication process may activate in response to the face recognizable distance and the skin reflectance value, and the RGB camera 240 may be awakened at block 450 or initiate facial detection using the RGB camera 240 at block 460.

After the facial recognition process at block 480, the method 400 proceeds to block 490. This step is similar to the step 370 discussed in relation with method 300. Similarly, block 492 is similar to step 372 of method 300, block 494 is similar to step 374 of method 300, and block 496 is similar to the step 376 of method 300.

FIG. 5 is a flowchart illustrating a facial authentication method, in accordance with one embodiment of the present disclosure. The method 500 may be performed, for example, by an electronic device 200 having an ambient light sensor 210 and a time of flight sensor 225. This method 500 utilizes the ambient light sensor 210 and the time of flight sensor 225 without using an RGB sensor 240 or an IR sensor 235 for facial authentication. The method 500 consumes significantly less image processing power that is typically required for an RGB camera in face recognition. The method 500 also uses low power consumption by using a time of flight sensor 225 to create depth maps for facial authentication. Similar steps will be omitted in order not to provide repetitive explanation. The method 500 begins with the electronic device 200 in a "locked" state or "signed out" state.

At block 510, the method 500 includes detecting a touch event or a gyroscope/accelerator event. This is similar to the step block 310 of the method 300 or step block 410 of the method 400.

When there is no touch event or gyro/accelerator event, the user presence may be detected by using an ambient light sensor 210. At block 520, the method 500 includes detecting user presence based on an ambient light change in a scene. The processor 255 determines that a user is present at the scene based on comparing the outputs from the sensor 210 with a minimum threshold value. When the ambient light sensor 210 senses ambient light change that exceeds the minimum threshold value, indicating a user is present in the scene, the method 500 will proceed to block 540.

On the other hand, if the ambient light sensor 210 senses ambient light change that does not exceed the minimum threshold value, and the processor 255 determines that it is not enough to indicate that a user is present in the scene, the method 500 will proceed to block 530. In other embodiments, the beam generator 215 may be used to assist the ambient light sensor 210 from detecting ambient light change.

At block 530, the step is basically similar to block 440. A first mode of the time of flight sensor 225 is used to detect liveliness, motion, or any gestures of the user based on distance change. After user presence is confirmed, the step moves to block 540.

At block 540, the method 500 includes waking up or activating the second mode of time of flight camera 225. The power management circuit 260 may deactivate the first mode of the time of flight camera 225 and activate the second mode of the time of flight camera 225. Other camera or sensors such as IR camera 235 and RGB camera 240 are not activated. Once the second mode of the time of flight camera 225 is awakened, the method 500 proceeds to block 550.

At block 550, the full-power time of flight camera 225 (i.e., the second mode of the time of flight camera 225) images or detects the user in the scene, which may be a person's face. The second mode of the time of flight camera 225 images the face by providing a full depth map of the face with high resolution. The second mode of the time of flight camera 225 may be any ToF camera having suitable resolution to provide a full depth map of a human face, and to suitably determine the presence of a human face based on the depth map. That is, at block 550, the second mode of the time of flight camera 225 detects the presence of a face based on the generated full depth map of the face. Once the high-resolution depth map of the face of the user is generated, the method 500 proceeds to block 570.

At block 570, the depth map of the face of the user is compared to the pre-stored authorized user's face. During this face comparing process, one or more facial recognition or other such algorithms may be employed to identify the detected face (of the depth map of the face) as being the face of an authenticated user. The face is identified based on whether the full depth map of the face and the pre-stored authorized user's face substantially match with each other.

As mentioned, the anti-spoofing step at block 560 may be performed after block 550 and before block 570. However, in other embodiments, the anti-spoofing step at block 560 may be performed in conjunction with blocks 520 and 530. In these embodiments, block 560 need not be performed again, and the method 500 will proceed from block 550 to block 570 without undergoing the anti-spoofing step at block 560. The reflectance sensing and the depth sensing may be performed based on the first mode of the time of flight sensor 225. While the second mode of time of flight sensor 225 is also capable of sensing reflectance and depth, the second mode operates at a higher power mode than the first mode. In this regard, the power management circuit 260 may deactivate the second mode of the time of flight sensor 225 and activate the first mode of the time of flight sensor 225 to save power consumption. In some embodiments, the anti-spoofing step block 560 may be combined with step block 530, and the skin reflectance value and the distance measurement (e.g., face recognizable distance) may be detected at the same time using the time of flight sensor 225. That is, a facial authentication process may initiate in response to the face recognizable distance and the skin reflectance value, and the time of flight camera 225 operating under a second mode (which is a full-power time of flight sensor capable of depth sensing and generating depth map of the scene) may be awakened at block 540 or may initiate facial detection using the second mode time of flight camera 225 at block 550.

When a user's face has been identified at block 570 as being that of an authorized user of the electronic device 200, then the output of block 570 may be provided to an unlocking feature in the electronic device 220 after the method 500 goes through the steps at blocks 580, 582, 584, 586. The step at block 580 is similar to step at block 490 of method 400 or step at block 370 of method 300; the step at block 582 is similar to step at block 492 of method 400 or step at block 372 of method 300; the step at block 584 is similar to step at block 494 of method 400 or step at block 374 of method 300; the step at block 586 is similar to step at block 496 of method 400 or step at block 376 of method 300, and similar explanations will be omitted to avoid repetition.

The electronic device or the system according to the present disclosure seeks to save power consumption within the device or the system based on a powered tiered approach. Those tiers may, for example, be divided into four system states (e.g., ultra low-power state, low-power state, wake-up/sleep state, and full-power state). The ultra low-power state consumes the lowest power and the full-power state consumes the most power. The low-power state and the wake-up/sleep state are states in between the full-power state and the ultra low-power state. The wake-up/sleep state consumes more power than the low-power state.

The least amount of power that is used in the device is the ambient light sensor. An ambient light monitor included in the ambient light sensor operates at an ultra low-power state. Utilizing this ultra low-power state to first initially detect user presence assists in keeping down the overall power consumption in the electronic device, and detect user presence in an effective manner. If a light change is triggered (for example, a change in the scene or a change in the field of view), the ambient light sensor shifts from ultra low-power state to a low power or a wake-up state. If the ambient light sensor utilizes high-level functionality, such as camera auto white balance assist, camera auto exposure assist, or indoor/outdoor assist, the ambient light sensor will operate at a full-power mode. While using these high-level functions, which are highly sensitive in detecting user presence, the amount of power consumed will be significant. A time of flight sensor may be rather used, because the time of flight sensor may achieve the same goal with less power consumption.

The object distance estimate included in the time of flight sensor operates between the ultra low-power state and the low-power state. Since the ambient light monitor consumes slightly less power than the object distance estimator of the time of flight sensor, the device according to the present disclosure utilizes the ambient light sensor first and the time of flight sensor next to achieve the most efficient power consumption during facial authentication. The time of flight sensor operates at the low-power state or wake-up state when movement is triggered. When the time of flight sensor operates at full-power, which enables the time of flight sensor to detect depth sensing and generate depth map, and also perform object type classifying function (e.g., capable of classifying the type of object based on the depth sensed or the generated depth map), the time of flight sensor uses the most power. However, even so, the power consumed at the time of flight sensor in this state is still less power-consuming than the image processing power involved using an RGB camera or an IR camera or sensors using structured light, etc.

The RGB camera processes significant amount of data and is not capable of operating at an ultra low-power state. The RGB camera may be able to operate at a lower power state and sense change in the field of view. When a facial authentication process is triggered by the RGB camera, the camera wakes up and it operates at the wake-up/sleep state. When the facial authentication has to be performed using RGB cameras, the most image processing power is required due to having to process various recognition parameters.

Due to the aforementioned shortcomings of the RGB cameras or other high-power driven IR cameras or sensors using structured light to detect user faces, the device according to the present disclosure does a tiered-power approach by using minimum power consumption for detecting ambient light, detecting distance change, and generating depth map. The time of flight sensor as used herein that operates at a first mode may be a low-power mode that uses the object distance estimator to detect user presence by distance change. This first mode may also be referred to as a mode producing low resolution, since detecting user presence does not require high resolution. The second mode of the time of flight sensor may be a high-power mode that uses depth sensing and depth maps to authenticate user face. This second mode produces high resolution, and thus consumes higher power than the first mode. However, even so, the power consumed under the second mode of time of flight sensor uses less power than the power used by RGB cameras or IR cameras during image processing. Accordingly, the device or system according to the present disclosure provides a face authentication process that is accurate and less power-consuming, and cost efficient.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
an ambient light sensor that detects, in operation, a change in ambient light in a field of view, the change of the ambient light in the field of view exceeding a minimum threshold indicative of a presence of a user;
a ranging sensor including a time of flight sensor that generates, in operation, a plurality of distance measurements from the time of flight sensor to a plurality of elements on a face of the user, the time of flight sensor configured to have a first mode and a second mode of operation, wherein both the first mode and the second mode, in use, detect a skin reflectance value of the user, the first mode of the time of flight sensor, in operation, detects motion of the user based on a change of distance from the user and the time of flight sensor within a face recognizable distance, the face recognizable distance being a distance between a first presence detection threshold and a second presence detection threshold, the second mode of the time of flight sensor, in operation, generates a depth map of the user's face based on the plurality of distance measurements within the face recognizable distance, the depth map of the user including a depth map of the face of the user; and
a processor coupled to the time of flight sensor and that in operation, receives inputs from the time of flight sensor and outputs a user presence signal in response to the plurality of inputs and activates a facial recognition process in response to the user presence signal and determines whether the depth map of the face of the user is associated with an authorized user of the device.

2. The device of claim 1 wherein the time of flight sensor detects, in operation, a user distance measurement of the user within a range between a first presence detection threshold and a second presence detection threshold, the first presence detection threshold is a minimum threshold distance for detecting the face of the user and the second presence detection threshold is a maximum threshold distance for detecting the face of the user, wherein the ranging sensor includes a reflectance sensor that detects, in operation, a reflectance measurement of the user within the range based on a surface characteristic of the user, wherein the plurality of inputs includes the user distance measurement based on the time of flight sensor and the reflectance measurement based on the reflectance sensor.

3. The device of claim 2
wherein the time of flight sensor in the first mode of operation, detects the presence of the user within the range based on change of the user distance measurement from the user and the time of flight sensor, the presence of the user triggers the processor to output the user presence signal,
wherein the first mode of the time of flight sensor operates at a lower power mode than the second mode of the time of flight sensor.

4. The device of claim 1 further comprising
a beam generator that, in operation, illuminates light toward the field of view to increase luminosity, the processor, when in operation, activates the beam generator to flash light in response to an output from the ambient light sensor output being below a threshold value for detecting the presence of the user, and activates the ranging sensor in response to the ambient light sensor detecting the presence of the user.

5. The device of claim 3 wherein the processor, when in operation,
generates recognition parameters for the face of the user based on the depth map of the face of the user; and
determines that the face of the user is associated with an authorized user based on the depth map of the face of the user and the recognition parameter.

6. The device of claim 5 wherein the processor determining that the face of the user is associated with an authorized user includes,
comparing the authorized user and the face of the user based on the depth map of the face of the user and the recognition parameter, and
determining the authorized user substantially matches the depth map of the face of the user when the match exceeds a predetermined threshold.

7. The device of claim 6 wherein the device includes a first state and a second state, the first state includes a state where the device is locked and is inaccessible without a pin code, the second state includes a state where the device is unlocked and accessible,
the device maintains the first state upon the processor determining that the match between the face of the user and the authorized user does not exceed the predetermined threshold, and
the device switches from the first state to the second state upon the processor determining that the match between the face of the user and the authorized user exceeds the predetermined threshold.

8. A system, comprising:
an ambient light sensor that detects, in operation, a change in ambient light in a field of view, the change of the ambient light in the field of view exceeding a minimum threshold indicative of a presence of a user; and
a time of flight sensor that is configured to have a first mode and a second mode of operation, wherein both the first mode and the second mode, in use, detect a skin reflectance value of the user,
the first mode of the time of flight sensor, in operation, detects motion of the user based on a change of distance from the user and the time of flight sensor within a face recognizable distance, the face recognizable distance being a distance between a first presence detection threshold and a second presence detection threshold,
the second mode of the time of flight sensor, in operation, detects multiple distances of the user within a face recognizable distance and generates a depth map of the user's face based on the detected multiple distances, the depth map of the user including a depth map of the face of the user; and
a processor, coupled to time of flight sensor that in operation, receives inputs from the time of flight sensor via an electronic device and determines whether the depth map of the face of the user is associated with an authorized user of the electronic device.

9. The system of claim 8 wherein a magnitude of power consumed in the ambient light sensor is less than the first mode of the time of flight sensor, and the first mode of the time of flight sensor uses less power than the second mode of the time of flight sensor.

10. The system of claim 8 wherein the first presence detection threshold is a minimum distance from the time of flight sensor to the user capable of performing a facial authentication process and the second presence detection threshold is a maximum distance from the time of flight sensor to the user capable of performing the facial authentication process,
wherein the skin reflectance value is between a first reflectance threshold and a second reflectance threshold, the first reflectance threshold indicative of an expected minimum skin reflectance value that a human possesses and the second reflectance threshold indicative of an expected maximum skin reflectance value that a human possesses.

11. A method, comprising:
detecting, by a time of flight sensor, a face at a recognizable distance positioned between a first presence detection threshold and a second presence detection threshold;
sensing, by the time of flight sensor, a skin reflectance value that is between a first reflectance threshold and a second reflectance threshold;
activating a facial authentication process in response to the face recognizable distance being between the first and second presence detection thresholds and the skin reflectance value being between the first and second reflectance thresholds;
operating the time of flight sensor in a first mode for the detecting the face recognizable distance and the skin reflectance value;
operating the time of flight sensor is a second mode for generating a depth map of a face of the user, the second mode consuming more power mode than the first mode;
activating a facial authentication process including:
activating the second mode of the time of flight sensor;
detecting, by the time of flight sensor, multiple distance measurements within the face recognizable distance of the user;
generating the depth map of the face of the user based on the multiple distance measurements;
generating recognition parameters for the face of the user based on the depth map of the face of the user; and
determining, by a processor, the face of the user is associated with an authorized user based on the depth map of the face of the user and the recognition parameter.

12. The method of claim 11, wherein the first presence detection threshold is a minimum distance from the time of flight sensor to the user capable of activating the facial authentication process and the second presence detection threshold is a maximum distance from the time of flight sensor to the user capable of activating the facial authentication process.

13. The method of claim 11, further comprising:
activating an image sensor;
capturing, by the image sensor, at least one image of a face of the user within the face recognizable distance;
performing face recognition on the at least one image of the face of the user;
generating recognition parameters for the face of the user based on the face recognition performed on the at least one image; and
determining, by a processor, the face of the user in the at least one image is associated with a face of an authorized user based on at least one of the recognition parameters, the skin reflectance value and the face recognizable distance.

14. The method of claim 13, further comprising:
prior to activating the image sensor, detecting a second face recognizable distance between the first presence detection threshold and the second presence detection threshold; and re-sensing, by the time of flight sensor, the skin reflectance value of the user.

15. The method of claim 11, further comprising:

prior to detecting the face recognizable distance, activating an ambient light sensor;

detecting, by the ambient light sensor, a change in an ambient light of the field of view above a minimum threshold value, the minimum threshold value indicative of a user's face in the field of view; and activating the time of flight sensor for detecting a face distance in response to the user presence detected by the ambient light sensor.

16. The method of claim 11, further comprising:

prior to the step of detecting the face recognizable distance, activating an ambient light sensor;

detecting, by the ambient light sensor, a change in an ambient light of the field of view above a minimum threshold value, the minimum threshold value indicative of a user presence in the field of view;

activating a beam generator in response to the change in the ambient light not exceeding the minimum threshold value;

illuminating, by the beam generator, light toward the field of view;

re-detecting, by the ambient light sensor, the change in the ambient light in the field of view; and activating the time of flight sensor for the detecting of the face recognizable distance in response to the user presence detected by the ambient light sensor.

17. The method of claim 11, further comprising:

unlocking the electronic device in response to determining that the face of the user substantially matches with a face of the authorized user.

* * * * *